(12) United States Patent
Smith

(10) Patent No.: US 7,299,823 B2
(45) Date of Patent: Nov. 27, 2007

(54) CONNECTOR

(75) Inventor: Anthony George Smith, Boreham Wood (GB)

(73) Assignee: Huntleigh Technology Limited (GB)

( * ) Notice: Subject to any disclaimer, the term of this patent is extended or adjusted under 35 U.S.C. 154(b) by 270 days.

(21) Appl. No.: 10/483,459

(22) PCT Filed: Jul. 1, 2002

(86) PCT No.: PCT/GB02/03030

§ 371 (c)(1),
(2), (4) Date: Jun. 7, 2004

(87) PCT Pub. No.: WO03/006868

PCT Pub. Date: Jan. 23, 2003

(65) Prior Publication Data

US 2004/0211473 A1    Oct. 28, 2004

(30) Foreign Application Priority Data

Jul. 12, 2001    (GB) ................................. 0116998.6

(51) Int. Cl.
*F17D 1/00* (2006.01)
(52) U.S. Cl. ................. 137/597; 251/149.6; 285/124.1
(58) Field of Classification Search ................ 137/597, 137/563, 515.7, 859, 843; 251/149.6; 285/121.1
See application file for complete search history.

(56) References Cited

U.S. PATENT DOCUMENTS

| 2,359,648 | A | * | 10/1944 | Jones | ........................ 137/594 |
| 2,628,850 | A | | 2/1953 | Summerville | |
| 3,843,172 | A | * | 10/1974 | Stevens, Jr. | .............. 222/400.7 |
| 3,974,848 | A | | 8/1976 | Wheatley | |
| 4,089,444 | A | * | 5/1978 | Shea | ........................ 222/400.7 |
| 4,105,046 | A | * | 8/1978 | Sturgis | ........................ 137/594 |
| 4,476,897 | A | * | 10/1984 | Morrill | ........................ 137/594 |
| 4,753,268 | A | | 6/1988 | Palau | |

(Continued)

FOREIGN PATENT DOCUMENTS

EP    0105758 A1    4/1984

(Continued)

*Primary Examiner*—Cloud K. Lee
(74) *Attorney, Agent, or Firm*—Craig A. Fieschko, Esq.; DeWitt Ross & Stevens S.C.

(57) ABSTRACT

A connector (1) connects an air-inflatable mattress (4) which alternately inflatable cells (11, 12) to a pump. Air-supply lines (13, 14) from the pump are attached to male parts (2) of connector (1). Air-supply lines (15, 16) from mattress (4) connect to passages (17, 18) of female parts (3) of the connector (1). When the male parts (2) and the female parts (3) are engaged, supply lines (13, 14) are in fluid communication with fluid lines (15, 16) via passages (17, 18) in the female part (3). When the male parts (2) are removed from the connector (1) to disconnect the air supply, one-way valves (7) seal the air-supply lines (13, 14) and expose a cross-connect port (8) in interconnecting the female part passages (17, 18). Thus cells (11, 12) are interconnected and the pressure is equalized throughout the mattress (4). The invention provides a self-sealing automatic transport mode connection system upon disengagement of the male parts (2) from the mattress (4), thus eliminating user error.

9 Claims, 2 Drawing Sheets

U.S. PATENT DOCUMENTS 4,953,592 A * 9/1990 Takahashi et al. ..... 137/599.11
5,152,319 A * 10/1992 Hannagan et al. ..... 137/624.18
5,261,638 A    11/1993 Onishi et al.
5,480,218 A *  1/1996 Hart et al. ..................... 303/28
5,709,436 A *  1/1998 Scott ........................... 303/86
6,062,244 A *  5/2000 Arkans ........................ 137/1
6,079,262 A *  6/2000 Palomeque et al. ........... 73/163
6,202,672 B1 * 3/2001 Ellis et al. .................. 137/223
6,302,147 B1 * 10/2001 Rose et al. ............ 137/614.03

FOREIGN PATENT DOCUMENTS

| | | |
|---|---|---|
| GB | 2081830 A | 2/1982 |
| GB | 2134612 A | 8/1984 |

* cited by examiner

CONNECTOR

This application is a national phase entry of PCT application PCT/GB02/03030, filed Jul. 1, 2002, which claims the priority of United Kingdom patent application 0116998.6, filed Jul. 12, 2001.

BACKGROUND OF INVENTION

The present invention relates to a connector for a fluid system having a plurality of fluid flow lines, for example, a connector for use in connecting an air-inflatable support to a pressurised air source such as a pump.

It is known to have air-inflatable mattresses for the prevention of bed-sores where the mattresses are supplied with air from compressors, which are usually located in a pump with associated control. In such cases one or more connectors may connect the air mattress and the pump for alternatively inflating and deflating sets of cells making up the mattress.

Connectors used in alternating mattress systems may facilitate cross connection of sets of alternating cells, to allow the system to cope without a pump for a short time. This allows, for example, a patient on the bed to be transported between two locations, as well as providing a safety feature in case of a power loss, since most pumps are mains power driven.

The overall support provided is kept roughly equal since the effective area (in a support comprising two sets of inflatable cells) is doubled and the pressure halved, as both sets of cells now support the patient in a static mode.

Several ways to do this have been proposed. Some involve removing the connector, sealing the connector via non-return valves and then using a switch to connect the cells together. Others involve removing the connector and physically connecting the ends of the tubes together, providing the tubes have two connectors that will mate.

In all of the above cases the actual function of employing the cross-connect (or sometimes the "transport") mode has to be done manually, and considered well before the action is taken. If this does not occur, the patient can suffer pressure damage during transport, as the patient may be inadequately supported.

SUMMARY OF INVENTION

The present invention aims, among other things, to overcome the problems of the prior art by providing a connector which can be used, for example, to facilitate safe and efficient transport of an air-inflatable mattress automatically upon disconnection from a fluid source.

In one aspect, the present invention provides a connector for connecting at least a pair of fluid flow lines, for each flow line the connector having a female part engageable with a respective male part in a coupled (or connected or engaged) state or position and readily separable to disconnect the fluid flow lines and put them in an uncoupled (or disconnected or disengaged) state. Each female part has at least one fluid flow passage connectable to one of said fluid flow lines, and in the coupled state the fluid flow passage or passages of each female part is in fluid communication with the respective passage or passages of a male part for flow through the connector, and in the uncoupled state the passage or passages of the female part is or are closed, and each female part is in fluid communication with one or more passage or passages extending through the connector, thereby interconnecting or cross connecting the passages of the respective female parts of the connector.

By shutting off the passages of the female parts on disconnection, any mattress to which the connector is attached is sealed, so that for example accidental disconnection of the connector does not result in deflation of the support or harm to the patient.

Non-return valves may be provided in the female parts to seal the connector automatically from the exterior (e.g., atmosphere) upon disconnection. Preferably, any such valves move as the male parts connected to the flow lines from the fluid source are removed, and thereafter cross connect the female part passageways of the connector.

Advantageously, the invention provides a self-sealing automatic transport mode connection system, operable automatically as soon as the male parts are disengaged from the mattress, thus eliminating user error.

A further advantage offered by connectors according to the invention is the prevention of possible harm caused when systems are left in transport mode accidentally when the pump is reconnected, thus not giving the correct therapy to the patient and resulting in possible harm to the patient. Connectors according to the invention may not only enter transport mode automatically when disengaged, but re-engages an existing therapy mode automatically when the connector is re-connected.

Preferably, the female parts' passageways can be cross connected along multiple lines in multiple pre-set ways, all without positive input or action from the user.

BRIEF DESCRIPTION OF THE DRAWINGS

A specific embodiment of the present invention is described in detail by way of example with reference to the accompanying drawings in which.

DETAILED DESCRIPTION

Figure 1:
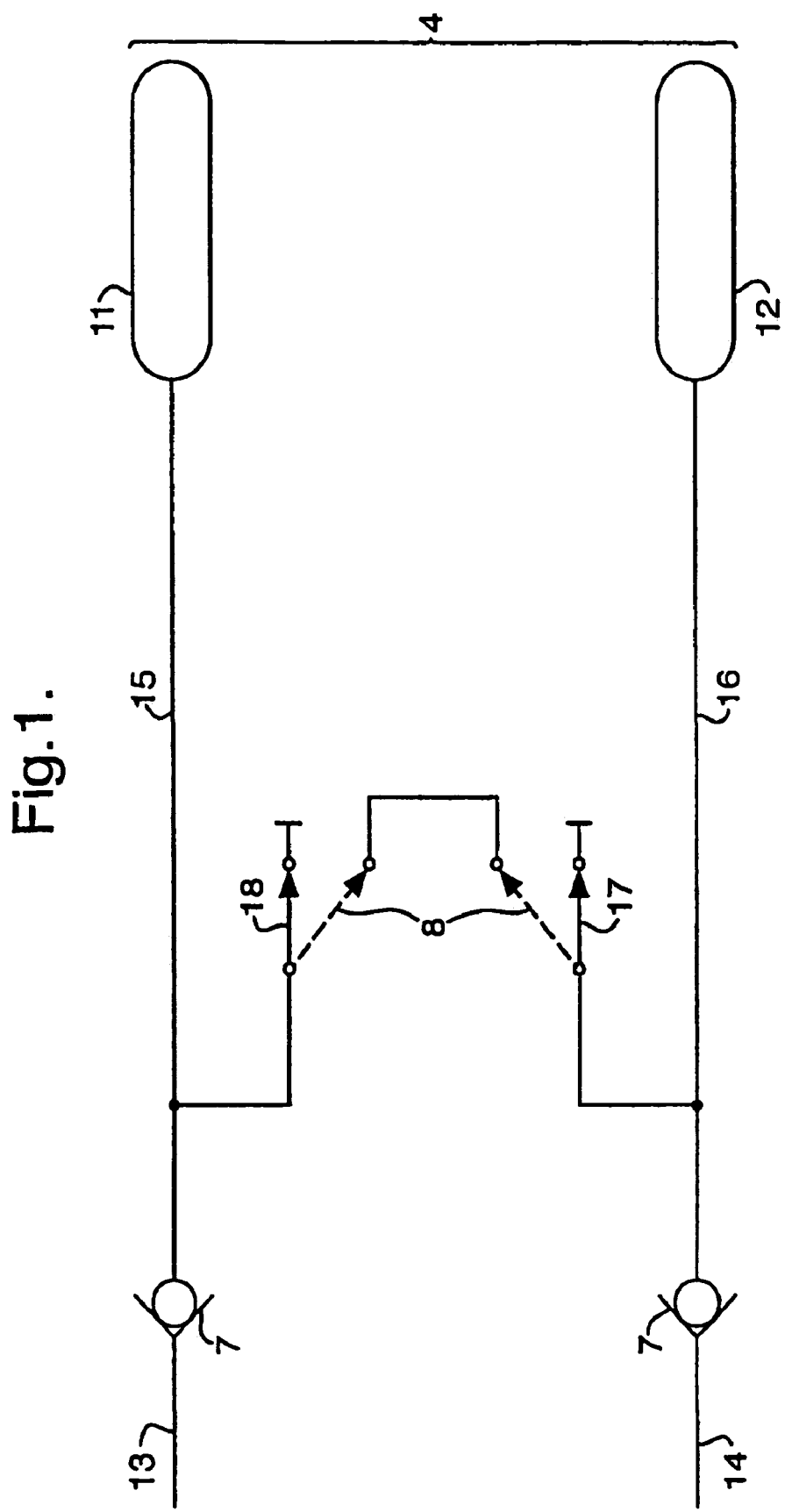
FIG. 1 is a pneumatic circuit drawing of an air-inflatable mattress with a connector and pump.

Referring to the figures, FIG. 1 shows a connector 1 connecting an air-inflatable mattress 4 for the control and prevention of bed-sores, to a pump 10 which includes compressors for inflating cells within the mattress 4.

The mattress 4 of FIG. 1 has two air-supply lines 13, 14 that carry air to sequentially inflate and deflate the two sets of inflatable cells, which may be provided, for example, in the form of transverse cells 11 and 12 in the mattress. In normal operation of the mattress 4, supporting a patient, air is supplied to and vented from the two sets of cells 11, 12 in a predetermined sequence under control of the pump 10, as for example for providing various predetermined therapy modes.

Each of the air-supply lines 13, 14 from the pump 10 is attached to a respective male part 2 of the connector 1.

Figure 2:
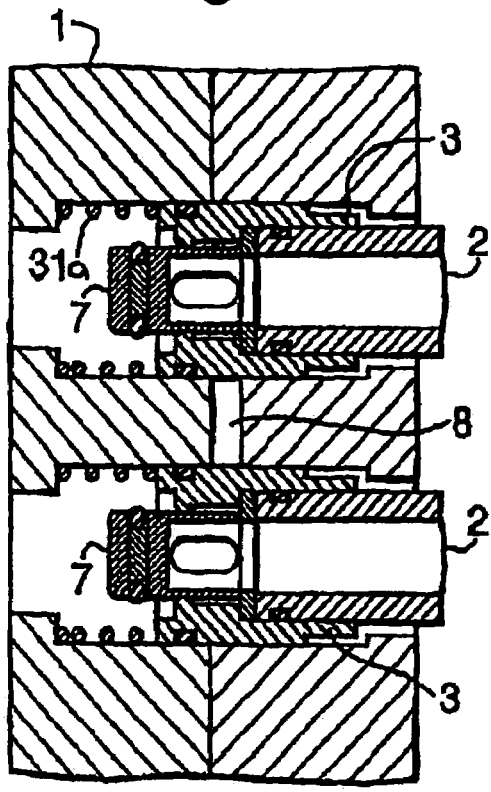
FIG. 2 shows a cross-section of a connector embodying the present invention with male and female parts engaged and with the connector in the 'ON' mode, or connected or coupled state.

Two corresponding air-supply lines 15, 16 run from the mattress 4 and connect to two passages 17, 18 of a female part 3 of the connector 1 (FIG. 2).

When the male part 2 and the female part 3 are engaged the two supply lines 13, 14 are in fluid communication with fluid lines 15, 16 from the mattress 4 via passages 17, 18 in the female part 3.

The connector has two modes of operation: 'OFF'—or cross connect, disconnected, uncoupled, or disengaged, when the male part and the female part are not engaged and 'ON'—or coupled, or connected or engaged when the male part 2 and the female part 3 are mutually engaged.

Figure 3:
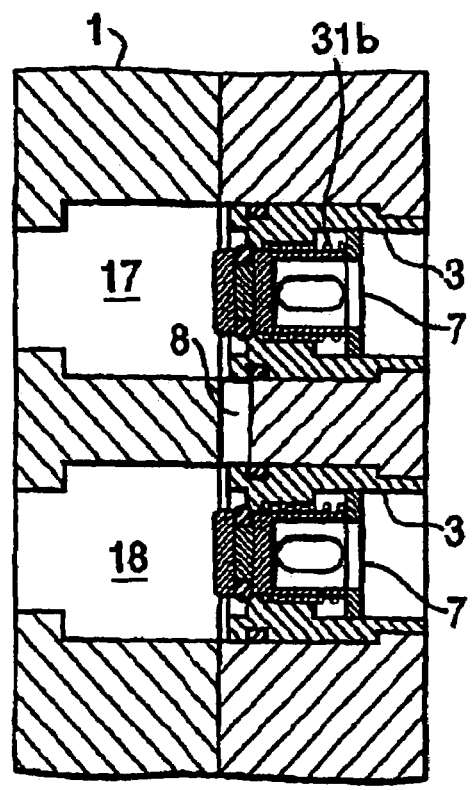
FIG. 3 shows a cross-section of female parts 3 of the connector in FIG. 2 in the disconnected or uncoupled state, with the male parts disconnected.

FIG. 3 shows the connector in the 'OFF' mode; the two air passages 17, 18 of the female parts 3 are sealed by the one-way valves 7 preventing any airflow flowing from the mattress 4. Additionally, the air passages 17, 18 are interconnected by cross connect port 8 such that the two sets of cells 11, 12 are interconnected so that the mattress 4 now supports the patient in a static mode. As the male parts 2 are removed from the female parts 3 to disconnect the air supply, the one-way valves 7 are returned to their original position by springs 31 (shown in alternative embodiments in FIGS. 2 and 3), thereby exposing the cross-connect port 8 interconnecting the female part passages 17, 18. Thus, the two sets of cells 11, 12 may be interconnected and the pressure may be equalised throughout the mattress 4.

FIG. 2 shows the connector in the 'ON' mode; each of the two air supply lines 13, 14 from the pump 10 is aligned with, and in fluid communication with, a respective one of the two lines 15, 16 to the mattress 4. During engagement, the male part 2 is pushed into the female part 3, moving the one-way valves 7 into the female part 3 thereby blocking a cross-connect port 8 and providing a flow through the connector 1. The flow through the connector 1 is in a substantially straight line with no impedance.

FIG. 3 shows the connector in the "OFF" mode; the two air passages 17, 18 of the female parts 3 are sealed by the one-way valves 7 preventing any airflow flowing from the mattress 4. Additionally, the air passages 17, 18 are interconnected by cross connect port 8 such that the two sets of cells 11, 12 are interconnected so that the mattress 4 now supports the patient in a static mode. As the male parts 2 are removed from the female parts 3 to disconnect the air supply, the one-way valves 7 are returned to their original position by springs 31a and 31b, as shown in alternative embodiments in FIGS. 2 and 3, respectively, thereby exposing the cross-connect port 8 interconnecting the female part passages 17, 18. Thus, the two sets of cells 11, 12 may be interconnected and the pressure may be equalised throughout the mattress 4.

The invention claimed is:

1. A connector for connecting inflatable cells to air supply lines, and for cross-connecting the inflatable cells when the inflatable cells are not connected to the air supply lines, the connector comprising:
   a. a pair of first connector parts, each first connector part including:
      (1) an air flow passage therein, the air flow passage being in fluid communication with at least one inflatable cell;
      (2) a female sleeve bounding at least a portion of the air flow passage,
   b. a pair of second connector parts, each second connector part being:
      (1) connected to a corresponding air supply line, and
      (2) defined by a male member configured to closely fit within the female sleeve of a corresponding first connector part,
   c. a cross-connection passage extending between the air flow passages of the first connector parts, wherein the female sleeve of each first connector part is biased:
      (1) to obstruct the cross-connection passage when one of the male members of the second connector parts is fit therein, whereby air cannot flow through the cross-connection passage and between the air flow passages of the first connector parts;
      (2) away from the cross-connection passage when one of the male members of the second connector parts is not fit therein, whereby air may flow between the air flow passages of the first connector parts through the cross-connection passage.

2. The connector of claim 1 wherein the male members of the second connector parts are identically sized and configured.

3. The connector of claim 1 further comprising valves, each valve being situated within a female sleeve.

4. The connector of claim 3 wherein each valve is biased within its female sleeve to yield when one of the male members of the second connector parts is fit within the female sleeve.

5. The connector of claim 3 wherein each valve:
   a. allows airflow through the female sleeve when one of the male members is fit within the female sleeve; and
   b. obstructs airflow through the female sleeve when no male member is fit within the female sleeve.

6. The connector of claim 1 wherein:
   a. the air flow passages of the first connector parts open onto the surfaces of the first connector parts;
   b. each female sleeve is biased within its air flow passage toward the surface of the first connector part of the female sleeve; and
   c. a valve is biased within each female sleeve toward the surface of the first connector part of the female sleeve and into a closed state.

7. The connector of claim 6 wherein, when one of the male members is inserted within one of the female sleeves,
   a. the female sleeve yields in a direction away from the surface of the first connector part of the female sleeve;
   b. the valve within the female sleeve yields in a direction away from the surface of the first connector part of the female sleeve, with the valve opening as it so yields.

8. The connector of claim 7, wherein:
   a. the female members of the first connector parts are identically sized and configured, and
   b. the male members of the second connector parts are identically sized and configured.

9. The connector of claim 1 wherein the cross-connection passage extends between the female sleeves of the first connector parts, with the female sleeves of the first connector parts obstructing the cross-connection passage when male members are fit within the female sleeves of the first connector parts.

* * * * *